Patented Aug. 20, 1935

2,011,790

UNITED STATES PATENT OFFICE 2,011,790

1-(PARAMETHOXYPHENYL)-2-FORMYL-AMINOPROPANES AND METHOD OF PREPARING SAME

Gordon A. Alles, Monterey Park, Calif.

No Drawing. Application March 13, 1934,
Serial No. 715,314

14 Claims. (Cl. 260—124)

This invention relates to a new and useful chemical compound 1-(paramethoxyphenyl)-2-formylaminopropane, and its derivatives, having the general formula $$CH_3O—C_6H_4—CH_2—CH(CH_3)—NR(CHO)$$

in which R designates hydrogen, an alkyl radical such as $CH_3—$, $C_2H_5—$, $C_3H_7—$, etc., or an aralkyl radical such as $C_6H_5—CH_2—$, $C_6H_5—C_2H_5—$, $C_6H_5—C_3H_7—$, etc. Compounds having this general formula will be hereinafter referred to as "1 - (paramethoxyphenyl) - 2 - formylaminopropanes". The invention also relates to a method of preparing compounds having the type formula above expressed, from paramethoxybenzyl methyl ketone ($CH_3—C_6H_4—CH_2—CO—CH_3$), and one or more compounds comprising the corresponding amine, $RNH_2$, and formic acid, the R in the amine formula having the same significance as designated in connection with the above general type formula. Production of 1-(paramethoxyphenyl)-2-formylaminopropanes has been carried out with good yields, by the method of the present invention, where R was:

Hydrogen _____ H—
An alkyl radical___ $CH_3—$, $CH_3—CH_2—$
An aralkyl radical_____ $C_6H_5—CH_2—$

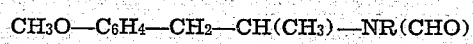

The formylaminopropanes of the present invention have some degree of physiological activity, but are particularly useful as intermediates for the production of isoquinoline derivatives, and also for the production of 1-(parahydroxyphenyl)-2-aminopropanes having the general type formula $HO—C_6H_4—CH_2—CH(CH_3)—NHR$ and their salts, which are physiologically active and produce effects in animals and man similar to those produced by tyramine and its salts.

A principal object of the present invention is to provide a new chemical compound 1-(paramethoxyphenyl) - 2 - formylaminopropane, and derivatives thereof, having the general type formula $$CH_3O—C_6H_4—CH_2—CH(CH_3)—NR(CHO)$$

in which R is selected from the group above-mentioned.

Another principal object of the invention is to provide a synthetic method of production of 1-(paramethoxyphenyl) - 2 - formylaminopropanes of the above general formula, which may be simply carried out with good yield.

The synthesis of these 1-(paramethoxyphenyl)-2-formylaminopropanes may be carried out with various starting materials but common to all is the reaction between paramethoxybenzyl methyl ketone and one or more compounds comprising an amine and formic acid, either alone or in the presence of some other substance.

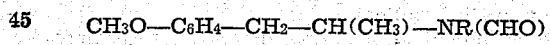

The actual starting materials used may comprise paramethoxybenzyl methyl ketone, together with either:

(a). An amine formate;
(b). An amine, and formic acid or a formate;
(c). A salt of an amine, and formic acid or a formate.

Thus, four preferable combinations and proportions for carrying out the reaction are as follows:

(1) The ketone and the amine formate. with the latter usually in excess of two mols per mol of ketone;

(2) The ketone, the amine, and formic acid, with the latter usually in excess of two mols per mol of ketone and the amine in amount equal or in excess of one mol per mol of ketone;

(3) The ketone, a salt of the amine, and formic acid, with each of the latter two materials usually in excess of two mols per mol of ketone; or, (4) The ketone, a salt of the amine, and sodium formate, with the latter two in equal mol amounts and usually each in amounts up to two mols per mol of ketone.

The water resulting from the condensation reactions involved, or any excess formic or other acid present, serves as a solvent which aids in promoting a smooth reaction between those substances desired to react. The reaction may be usually carried out without using a closed reaction vessel, but better yields are commonly obtained when using a pressure autoclave with close control of the temperatures used for conducting the reaction.

The synthesis may be carried out with good yield in accordance with any one of the following specific procedures:

(1) One mol of paramethoxybenzyl methyl ketone and four mols of ammonium formate are mixed and heated together preferably in a flask fitted with a reflux condenser, for a suitable period such as for six hours, maintaining the temperature between 150 and 170° C. After cooling, the product may be mixed with some water and the water insoluble layer that separates may be removed and distilled under reduced pressure. The fraction boiling between 195 and 205° C. under a pressure of 6 mm. of mercury is separated and consists substantially entirely of 1-(paramethoxyphenyl)-2 - formylaminopropane, suitable for use in the synthetic production of other compounds. This product gives analyses corresponding to $$CH_3O-C_6H_4-CH_2-CH(CH_3)-NH-CHO.$$

It may be used, for example, to produce 1-(paramethoxyphenyl)-2-aminopropane by hydrolysis thereof with alcoholic caustic soda solution or constant boiling hydrochloric acid. The product thus obtained may be identified in the form of its hydrochloric acid addition salt, which melts at 203 to 205° C.

(2) One mol of paramethoxybenzyl methyl ketone and one mol of benzylamine are mixed with two mols of ninety per cent formic acid and heated together, preferably in a flask fitted with a reflux condenser, for a suitable period such as six hours, maintaining the temperature between 115 and 130° C. The product may be mixed with water and the water-insoluble layer that separates may be removed, consisting substantially of crude 1-(paramethoxyphenyl)-2-formylbenzylaminopropane, which is suitable for use in the synthetic production of other compounds. For example, hydrolysis thereof with constant boiling hydrochloric acid yields 1-(paramethoxyphenyl)-2-benzylaminopropane which may be identified in the form of its hydrochloric acid addition salt, melting at 223° C.

(3) One mol of paramethoxybenzyl methyl ketone and four mols of ammonium acetate are mixed with two mols of ninety per cent formic acid and heated together with stirring, preferably in a high pressure autoclave, maintaining the temperature about 140° C. for a suitable period of, for example, three to four hours. The contents of the autoclave are mixed with benzene, the benzene extract separated, and the benzene then removed by distillation. The residue is distilled under reduced pressure and yields a large fraction boiling between 190 and 200° C. under pressure from 6 to 10 mm. of mercury, comprising quite pure 1-(paramethoxyphenyl)-2-formylaminopropane. This product may also be used in the production of other compounds. For example, when subjected to acid or alkali hydrolysis under suitable conditions it yields 1-(paramethoxyphenyl)-2-aminopropane which may be identified in the form of its hydrochloric acid addition salt.

(4) One mol of paramethoxybenzyl methyl ketone, one mol of methylamine hydrochloride, one mol of sodium formate and over a mol of ninety per cent formic acid are mixed and heated together, preferably in a flask fitted with a reflux condenser for a suitable period, such as six hours, maintaining the temperature between 120 and 130° C. The product is mixed with water and the insoluble layer that separates is taken up with ether. The ether extract may be freed of ether by distillation and the residue distilled under reduced pressure, yielding a fraction boiling between 210 and 220° C. under 8 mm. mercury pressure and consisting substantially of 1-(paramethoxyphenyl)-2-formylmethylaminopropane, suitable for use in the synthetic production of other compounds. For example, hydrolysis thereof with constant boiling hydrochloric acid yields, after suitable manipulation, 1-(paramethoxyphenyl)-2-methylaminopropane which may be identified in the form of its hydrochloric acid addition salt, melting at 176 to 177° C.

(5) One mol of paramethoxybenzyl methyl ketone, two mols of ethylamine hydrochloride and two mols of sodium formate are heated together at a temperature of 110 to 120° C. for a suitable period such as six hours. The product after extraction with water may be distilled under reduced pressure, yielding a fraction boiling between 205 and 215° C. under 4 mm. mercury pressure, consisting essentially of 1-(paramethoxyphenyl)-2-formylethylaminopropane, which is suitable for use in the synthetic production of other compounds. For example, hydrolysis thereof with constant boiling hydrochloric acid yields, after suitable manipulation, 1-(paramethoxyphenyl)-2-ethylaminopropane, which may be identified in the form of its hydrochloric acid addition salt, melting at 154 to 155° C.

The above specific examples of methods of preparing 1-(paramethoxyphenyl)-2-formylaminopropanes according to the present invention are illustrative of a type reaction in which an amine and formic acid are caused to react with a particular starting material, namely, paramethoxybenzyl methyl ketone. In the first specific example the said ketone is reacted with a compound which contains both an amine (ammonia) and formic acid, as a salt; in the second example an aralkyl amine, and formic acid introduced as such are jointly reacted with the ketone; in the third example an amine in the form of a salt, and formic acid introduced as such are jointly reacted with the ketone; in the fourth example the reaction is carried out with an alkyl amine in the form of an acid addition salt, and formic acid introduced in part as such and in part as an alkali salt of formic acid; and in the fifth example the reaction is carried out with another alkyl amine in the form of an acid addition salt, and formic acid introduced entirely as an alkali salt, in which case the liberation of formic acid for reaction with the base ketone is effected by the acidic nature of the amine compound. It will be comprehended that the above examples definitely illustrate that the process may be carried out by reacting the starting ketone with a reactive combination which contains or yields both an amine $RNH_2$ and formic acid, where R represents any one of a number of selected side radicals such as H— (first and third examples); $C_6H_5-CH_2-$ (second example); $CH_3-$ (fourth example); or $CH_3-CH_2-$ (fifth example).

In the claims on the method of preparing the compounds of this invention, it will be understood that the expression "a reactive combination yielding formic acid and an amine" (or yielding formic acid and ammonia or other specific member or subdivision of the general group of amines) is intended to cover any compound or mixture of compounds which either contains said formic acid and amine as such, or which is adapted, in the presence of the specific ketone, to yield such formic acid and amine.

I claim:

1. A chemical compound having the general type formula $$CH_3O-C_6H_4-CH_2-CH(CH_3)-NR(CHO)$$

in which R designates hydrogen, an alkyl radical, or an aralkyl radical.

2. A chemical compound, 1-(paramethoxyphenyl)-2-formylaminopropane, having the formula $$CH_3O-C_6H_4-CH_2-CH(CH_3)-NH(CHO).$$

3. A chemical compound as set forth in claim 1, in which R is an alkyl radical.

4. A chemical compound as set forth in claim 1, in which R is an aralkyl radical.

5. The method of preparing 1-(paramethoxyphenyl)-2-formylaminopropanes having the general type formula $$CH_3O-C_6H_4-CH_2-CH(CH_3)-NR(CHO)$$

which comprises: reacting paramethoxybenzyl methyl ketone with a reactive combination yielding formic acid and an amine $RNH_2$, R designating hydrogen, an alkyl radical, or an aralkyl radical.

6. The method of preparing 1-(paramethoxyphenyl)-2-formylaminopropane having the formula $$CH_3O-C_6H_4-CH_2-CH(CH_3)-NH(CHO)$$

which comprises: reacting paramethoxybenzyl methyl ketone with a reactive combination yielding ammonia and formic acid.

7. The method set forth in claim 6, said reactive combination comprising ammonium formate.

8. The method set forth in claim 6, said reactive combination comprising formic acid and a salt of ammonia.

9. The method of preparing 1-(paramethoxyphenyl)-2-formylaminopropanes having the general type formula $$CH_3O-C_6H_4-CH_2-CH(CH_3)-NR(CHO)$$

in which R designates an alkyl radical, which comprises: reacting paramethoxybenzyl methyl ketone with a reactive combination yielding an alkyl amine and formic acid.

10. The method set forth in claim 9, said reactive combination comprising a salt of an alkyl amine and a salt of formic acid.

11. The method of preparing 1-(paramethoxyphenyl)-2-formylaminopropanes having the general type formula $$CH_3O-C_6H_4-CH_2-CH(CH_3)-NR(CHO)$$

in which R designates an aralkyl radical, which comprises: reacting paramethoxybenzyl methyl ketone with a reactive combination yielding an aralkyl amine and formic acid.

12. The method of preparing 1-(paramethoxyphenyl-2-formylaminopropanes having the general type formula $$CH_3O-C_6H_4-CH_2-CH(CH_3)-NR(CHO)$$

which comprises: reacting paramethoxybenzyl methyl ketone with an amine formate of the general formula $RNH_2HCOOH$, R designating hydrogen, an alkyl radical or an aralkyl radical.

13. The method of preparing 1-(paramethoxyphenyl)-2-formylaminopropanes having the general type formula $$CH_3O-C_6H_4-CH_2-CH(CH_3)-NR(CHO)$$

which comprises: reacting paramethoxybenzyl methyl ketone, a salt of an amine $RNH_2$, and formic acid, R designating hydrogen, an alkyl radical or an aralkyl radical.

14. The method of preparing 1-(paramethoxyphenyl)-2-formylaminopropanes having the general type formula $$CH_2O-C_6H_4-CH_2-CH(CH_3)-NR(CHO)$$

which comprises: reacting paramethoxybenzyl methyl ketone, a salt of an amine $RNH_2$, and a salt of formic acid, R designating hydrogen, an alkyl radical or an aralkyl radical.

GORDON A. ALLES.